United States Patent
Haran et al.

(10) Patent No.: US 7,933,276 B2
(45) Date of Patent: Apr. 26, 2011

(54) DYNAMIC BANDWIDTH ALLOCATION PROCESSOR

(75) Inventors: Onn Haran, Even Yehuda (IL); Ariel Maislos, Sunnyvale, CA (US)

(73) Assignee: PMC-Sierra Israel Ltd., Herzliya Pituach (IL)

( * ) Notice: Subject to any disclaimer, the term of this patent is extended or adjusted under 35 U.S.C. 154(b) by 849 days.

(21) Appl. No.: 11/575,496

(22) PCT Filed: May 19, 2005

(86) PCT No.: PCT/IL2005/000520
§ 371 (c)(1),
(2), (4) Date: Mar. 18, 2007

(87) PCT Pub. No.: WO2006/051519
PCT Pub. Date: May 18, 2006

(65) Prior Publication Data
US 2009/0232159 A1    Sep. 17, 2009

Related U.S. Application Data

(60) Provisional application No. 60/626,907, filed on Nov. 12, 2004.

(51) Int. Cl.
H04L 12/28 (2006.01)
G06F 15/16 (2006.01)
G06F 13/36 (2006.01)
H04N 7/173 (2006.01)

(52) U.S. Cl. .............. 370/395.41; 709/219; 710/310; 725/95

(58) Field of Classification Search .......... 370/395.41; 709/219, 232, 251; 710/300
See application file for complete search history.

(56) References Cited

U.S. PATENT DOCUMENTS

| 2003/0027577 A1* | 2/2003 | Brown et al. ............... 455/445 |
| 2003/0061427 A1* | 3/2003 | O'Donnell ................. 710/300 |
| 2003/0126233 A1* | 7/2003 | Bryers et al. .............. 709/219 |
| 2004/0215861 A1* | 10/2004 | Beaudoin et al. ........... 710/300 |

FOREIGN PATENT DOCUMENTS
WO         01/77818 A2  * 10/2001
WO    WO2006/051519         5/2006
* cited by examiner

*Primary Examiner* — Seema S Rao
*Assistant Examiner* — Wanda Z Russell
(74) *Attorney, Agent, or Firm* — Mark M. Friedman

(57) ABSTRACT

A dynamic bandwidth allocation (DBA) processor comprises a DBA co-processor having DBA co-processor components and operative to perform and accelerate DBA functions, and a processing core logically coupled to the DBA co-processor through a processing bus and operative to configure and dynamically control all the DBA co-processor components and to run sections of algorithms that cannot be accelerated on the DBA co-processor. The DBA processor significantly accelerated the bandwidth allocation in a communications network such as an optical communications network or a fast wireless network. The DBA co-processor and the processing core may be integrated on a chip.

16 Claims, 4 Drawing Sheets

DYNAMIC BANDWIDTH ALLOCATION PROCESSOR

FIELD OF THE INVENTION

The present invention relates generally to central processor units (CPUs), and more particularly, to CPUs used in systems that handle Dynamic Bandwidth Allocation (DBA) processing.

BACKGROUND OF THE INVENTION

Shared media access protocols, such as EPON (specified in IEEE802.3ah) or GPON (specified in ITU-T G.984), describe systems comprised of an Optical Line Terminal (OLT) connected to several end devices called Optical Network Terminals (ONTs). An OLT controls the transmission time and transmission length of each ONT. The OLT uses a DBA algorithm in order to determine the transmission time and transmission length of each ONT.

A typical network is heavily oversubscribed, in a sense that more bandwidth (BW) is normally offered ("sold") to ONTs than can be delivered. A powerful processing system is required for the quick and fair allocation of bandwidth. One solution is to base such a processing system on off-the-shelf processors (e.g. central processing units or CPUs). In the present invention, "CPU" is used to represent all types of known processors. However, such standard, non-dedicated CPUs have a large response time and the processing done thereby takes a long computation time, limiting the performance. In the past, an off-the-shelf CPU solution was sufficient for low-speed, shared-media applications, for example in cable modems. Off-the-shelf CPUs are designed to solve a general purpose problem and are designed for a specific task. Examples for the latter include math co-processors, which are used for accelerating math operations, security co-processors, which are used for accelerating math operations dedicated for security, or graphic processors which are used for managing graphic displays. With the rapid growth of bandwidth and in particular with the two orders of magnitude increase in uplink bandwidths, the required response time decreases by about two orders of magnitude. Unless processing is expedited, the overall system performance is compromised.

Another type of solution is based purely on hardware (HW), but this solution lacks the flexibility required for future-proofing the network. The continuous introduction of bandwidth-hungry applications changes the profile of network usage tremendously. A carrier that invests significant resources in a network demands the flexibility to adapt the network to real-life evolving traffic. HW solutions tend to support a single algorithm or a limited number of algorithms, since an algorithm must be simple enough for implementation. Consequently, possible changes in the algorithms are limited, and so is the flexibility to adapt the network to changes.

There is thus a widely recognized need for, and it would be highly advantageous to have, a device and system that provide both the flexibility of a CPU and the strength of dedicated HW acceleration in dynamic allocation of bandwidth.

SUMMARY OF THE INVENTION

The present invention is of a device, system and method for high-capacity DBA acceleration. The acceleration may be implemented in optical communication networks, in particular passive optical networks (PON), as well as in non-optical communication networks, for example fast wireless networks. In particular, the invention discloses a new type of co-processor for accelerating DBA calculations. In the device, HW extensions dedicated to processing of DBA algorithms are added to a CPU "core", forming a system capable of performing high-capacity DBA accelerations. The device of the present invention is referred to hereinafter as a DBA processor. When implemented in a chip, the DBA processor is also referred to as a DBA processing system.

A general DBA method (algorithm) of the present invention comprises the steps of: understanding the queue status of each end station; determining the bandwidth allocated to each end station; and instructing end stations when and how much to transmit. An additional step includes providing the identity of the end station about to transmit to the physical layer (optical transceivers in case of PON, or radio frequency (RF) transmitters/receivers in case of wireless networks) and to the internal circuitries (e.g. counters that are based on identity of the transmitting end-station). In a preferred embodiment, and in contrast with prior art DBA methods, all these operations are preferably executed by the DBA processor, and represent functions of added hardware components. In alternative embodiments, the DBA processor may comprise configurations with fewer HW components, providing still advantageous acceleration over off-the-shelf CPUs.

Together with the DBA co-processor, the CPU core is a key element of the DBA processor. The core can be a standard CPU or similar processor. The connectivity between the DBA processing components (CPU core and various units) is preferably done through a bus, which can be an industry bus (OCP or AHB) or as an extension of the CPU op-codes. The connectivity between the DBA processing components, which defines the system operation, is unique.

According to the present invention there is provided, in a communications network implementing shared access between at least one central unit and a plurality of end-stations, a DBA processor comprising a DBA co-processor having DBA co-processor components and operative to perform and accelerate DBA functions, and a CPU core logically coupled to the DBA co-processor through a CPU bus and operative to configure and dynamically control all the DBA co-processor components and to run sections of algorithms that cannot be accelerated on the DBA co-processor, whereby the DBA processor provides both the flexibility of a CPU and the strength of dedicated hardware acceleration in dynamic allocation of bandwidth in the communications network.

According to one aspect of the DBA processor of the present invention, the DBA co-processor components include an end-station queue status query unit operative to process end-station requests, a bandwidth allocation unit operative to decide the amount of allocated bandwidth to each end station, a commanding end-stations unit operative to pass the information on the allocated bandwidth to the end-stations, and, optionally, a monitoring unit operative to remember the allocation and to follow a timeline to assist internal and external circuitries in the system to follow end station transmissions. The various units are interconnected by a plurality of buses. The DBA co-processor is also connected by a bus to an incoming datapath and by another bus to an outgoing datapath.

According to the present invention there is provided in a communications network implementing shared access between at least one central unit and a plurality of end-stations, a DBA processor comprising a central processing unit (CPU) core, a CPU bus coupled to the CPU core, and a dedicated hardware DBA processing module coupled to the CPU core through the CPU bus and operative to perform and accelerate DBA functions, the module including a bandwidth allocation unit operative to decide the amount of allocated bandwidth to each end station and one or more of the following units: an end-station queue status query unit coupled to the bandwidth allocation unit and operative to process end-station requests, a commanding end-stations unit operative to pass the information on the allocated bandwidth to the end-stations, and a monitoring unit operative to remember the bandwidth allocation and to follow a timeline to assist internal and external circuitries in the network to follow end station transmissions.

According to the present invention there is provided a method for accelerating DBA functions in a communications network implementing shared access between at least one central unit and a plurality of end-stations, the method comprising the steps of providing a DBA co-processor having DBA co-processor components and operative to perform and accelerate DBA functions, and providing a central processing unit (CPU) core logically coupled to the DBA co-processor through a CPU bus and operative to configure and dynamically control all the DBA co-processor components and to run sections of algorithms that cannot be accelerated on the DBA co-processor.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention provides, in various embodiments, a device, system and method capable of flexible and powerful bandwidth allocation processing. The various embodiments are described in detail with reference to DBA processing.

Figure 1A:
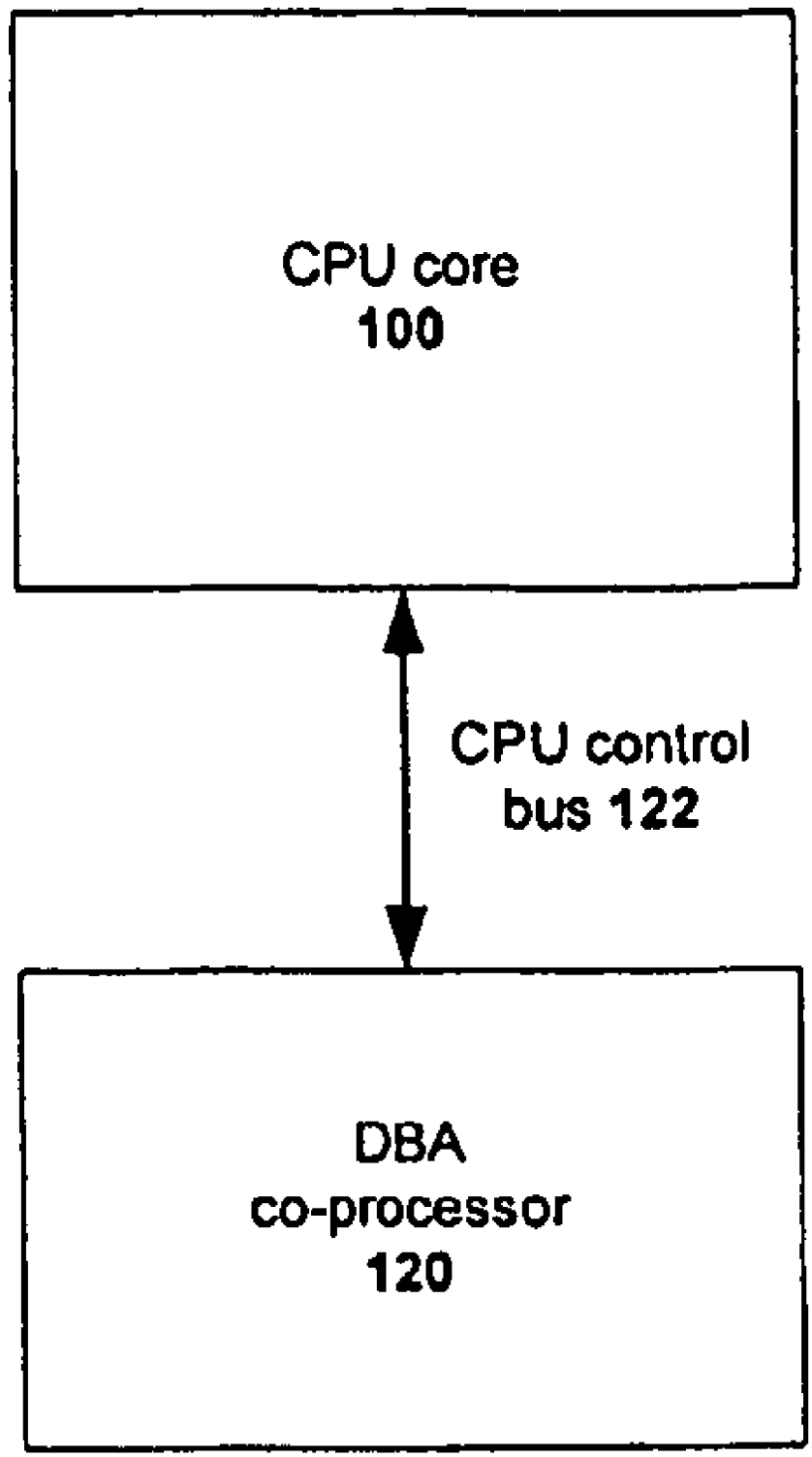
FIG. 1 shows schematically in: (a) a simplified block diagram, and in (b) a detailed block diagram of a DBA processor system according to the present invention.

FIG. 1 shows schematically in (a) a simplified block diagram and in (b) a detailed block diagram of a DBA processor (or "processing system" when integrated on a chip) according to the present invention. The DBA processor comprises a CPU core 100 coupled to and communicating with a DBA co-processor 120 through a CPU bus 122. The CPU core is operative to configure and dynamically control all system components and to run sections of algorithms that cannot be accelerated on co-processor 120. Co-processor 120 represents a uniquely inventive feature of the present invention. It preferably comprises a bandwidth allocation unit 104, which decides the amount of allocated bandwidth to each end station based on collected information and a set of rules in response to the end-station requests and based of set of rules configured by the CPU. Unit 104 represents a key component of the DBA processor. Its ability to perform complex calculations in parallel to other operations of the CPU core and other elements of the DBA processor extends dramatically the CPU core performance. Core 100 and co-processor 120 may be separate elements connected hybridly, or two elements integrated in one chip (in which case they represent the DBA processing system as a "system-on-chip").

Optionally, the DBA co-processor may further comprise an end-station queue status query unit 102 responsible for processing end-station requests, a commanding end-stations unit 106, which is responsible for passing the allocation information to the end-stations and a monitoring unit 108, which remembers the allocation and follows the timeline to assist internal and external circuitries to follow the end stations transmission. Bus 122 is thus used to convey information between CPU core 100 and the DBA co-processor components 102-108. The DBA co-processor further comprises a data-path receive bus 124 used for transferring a stream of data and control packets from a data-path toward the DBA processor; a data-path transmit bus 126 used for transmitting messages toward the data-path; a monitor bus 128 used for transmitting the identity of an end station about to transmit to all units of the system that require this information; an end station status bus 130 used for transferring processed end-station status from unit 102 to unit 104; an allocation bus 132 used for transferring allocation results from unit 104 to unit 106; and a map bus 134 used for transferring the location of end-station transmissions from unit 106 to unit 108.

A major advantage of the DBA processor is its completeness, since it covers all required operations for performing efficient DBA processing. Each element mentioned serves a specific role in the acceleration and eases the burden of the CPU core. The presence of local buses 130, 132, and 134 that interconnect all modules (units 102-108) allows very efficient operation, minimizing the required CPU intervention. In addition, bandwidth allocation unit 104 has a tremendous impact on improving DBA processor capabilities.

As mentioned, CPU core 100 may be any CPU core available on the market, and which has a bus (122) that enables to extend its connectivity to control additional components. The only requirement of this bus is its speed. The CPU core and the bus may be the limiting factors for high performance. A good system will maximize the CPU and bus speed. An exemplary CPU control bus useful for the present invention is the OCP bus, standardized by the Open Code Protocol (OCP) International partnership.

Each of the main units of the DBA processor system is now described in more enabling detail. As emphasized throughout, some of the units/blocks mentioned hereafter may not appear in all embodiments, still leaving such embodiments with significant advantages over existing solutions.

End-Station Queue Status Query Unit 102

Figure 2:
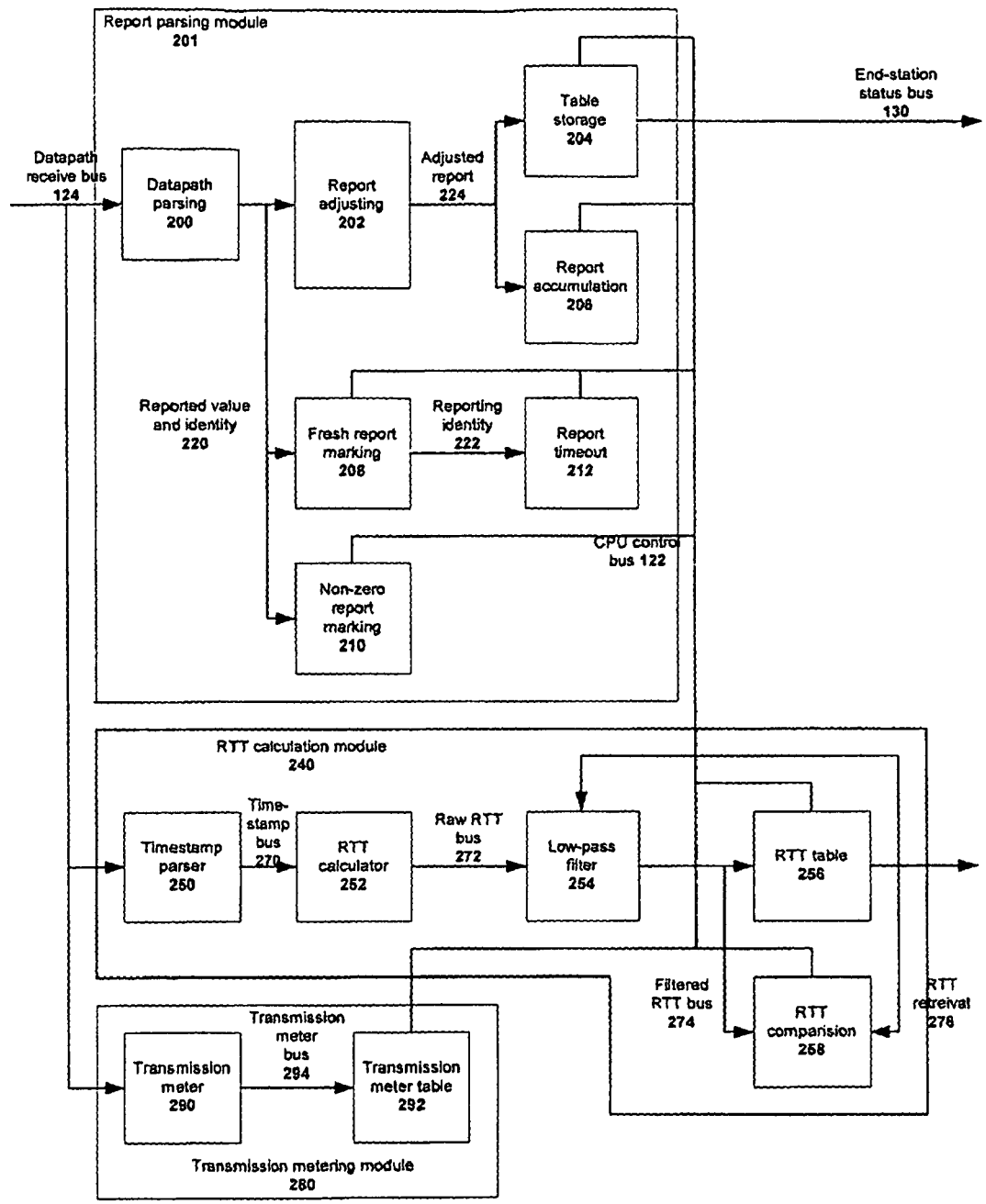
FIG. 2 shows schematically a block diagram of an end-station an end-station queue status query unit.

FIG. 2 shows schematically a block diagram of unit 102. Unit 102 preferably includes a report parsing module 201, which includes blocks 200-212, a round trip time (RTT) calculation module 240, which includes blocks 250-258, and a transmission metering module 280, which includes blocks 290 and 292. In some embodiments, RTT calculation module 240 and transmission metering module 280 may be optional.

A data stream received on data-path receive bus 124 is input to data-parsing block 200, to a timestamp parser block 250 and to a transmission meter block 290. The parsing (identification of a packet from the stream and extraction of the relevant fields) may be of either Multipoint Control Protocol (MPCP) messages for support of IEEE802.3 EPON, or of dynamic bandwidth report upstream (DBRU) messages for support of ITU-T G.984 GPON. The implementation of the DBA acceleration of the present invention is thus not limited to a single standard. Block 200 is capable of identifying report messages in the data stream and to extract report values from each message. The values and the identification of the reporting end station are conveyed through a reported value and identity bus 220 to a report adjusting block 202, to a fresh report making block 208 and to a non-zero report marking block 210. Block 202 uses the collected values and adjusts them to ease the calculations performed in the allocation stage. The adjustment may include mathematical functions, such as "limiting from above" (i.e. maximum), "limiting from below" (i.e. minimum), an Arithmetic Logic Unit (ALU) operation relative to last received report or transmitted grant, or any other required adjustment. Performing all of these seemingly trivial operations adds a significant amount of processing power. An adjusted report 224 reaches a table storage 204, which stores the most recent received report value for each end station. Table storage 204 maintains several storage cells-per each end-station, placing each service in a dedicated storage cell. Items belonging to the same end station and describing different services are collected in the table even when arriving, inside several separate messages. The table output is sent to end-station status bus 130.

A report accumulation block 206 also receives adjusted report 224 and accumulates the reported value to assist the CPU with calibration. A fresh report marking block 208 marks fresh reports for the sake of identifying end-station activity. This information is conveyed through a reporting identity interface 222 to a report timeout block 212 that receives this information and runs a timeout of the report arrival. The timeout measures the time elapsed since the last reception of a report message in order to detect link disconnection. A non-zero report marking unit 210 identifies non-empty reports to assist the CPU core in reading only the meaningful data. The key blocks of unit 102 are report adjusting block 202, which adjusts reports for saving considerable amount of CPU power, and report timeout block 212, which eases the CPU real-time requirements.

Among the units in report parsing module 201, only blocks 200, 204 and 206 are mandatory. In some embodiments, one or more of the other blocks may be missing, with some penalty to system performance, but still with major advantages over present systems. Examples of such optional blocks include blocks 202 and 212.

RTT calculation module 240 follows the timing of end station transmission in order to identify drifts and to maximize uplink utilization. A timestamp parser 250 identifies messages with timestamps in the data-path. The timestamp value is parsed, and passed along with the end station identity in a time-stamp bus 270. A RTT calculator 252 subtracts the local time from the parsed timestamp value. The result is conveyed to a raw RTT bus 272. A (preferably low-pass) filter 254 runs a low-pass filtering operation for ignoring jitter in the values received through RTT bus 272. The current RTT value and the previous one comprise a filtered value, which is conveyed forward in a filtered RTT bus 274. An RTT table 256 is provided for storing the latest RTT values per end station. Table 256 is accessible to the CPU core for both read and write, and is capable of feeding multiple blocks in the system. A RTT retrieval bus 276 is used to pass the current RTT value information from RTT table 256 to blocks 254 and 258, the latter being a RTT comparator that compares the current RTT value with the previous one to detect drifts and issue an alarm if such a drift is detected. The key element in RTT calculation module 240 is RTT table 256, which stores the freshest RTT value.

A transmission metering module 280 is responsible for collecting feedback about real usage of the PON uplink. The collected amount is accumulated per end station. By adding this module to the system, it is possible to compare the transmitted amount with the granted one and to close a loop in the algorithm. A transmission meter 290 connects to a transmission meter table 292 for storing the values (number of bytes received from each end-station) using a transmission meter bus 294. The key element in module 280 is transmission meter 290.

Bandwidth Allocation Unit 104

Figure 3:
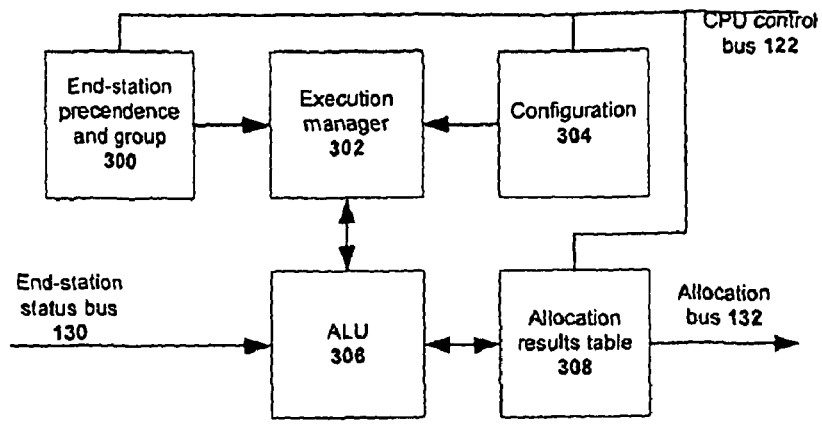
FIG. 3 shows schematically a block diagram of a bandwidth allocation unit.

FIG. 3 shows schematically a block diagram of the bandwidth allocation unit. Unit 104 comprises an end-station and group precedence storage block 300 that holds the precedence of each end-station and group information. There could be several groups, chosen for the allocation procedure based on configuration. A configuration subunit 304 is operative to set all execution manager options. An execution manager 302 is operative to perform multiple allocation loops, each looping over end-stations as configured in storage block 300. The execution manager follows the sum of allocated bandwidth, and based on the sum can decide to stop the allocation, to further extend the allocation, or to scale the allocation. An ALU 306 uses the end-station status bus 130, and processes each status value to an allocated value. ALU 306 is capable of a simple addition of a specific value of a specific service, or manipulation of the value, e.g. increasing/decreasing/multiplying/dividing the value based on execution manager commands. The allocation table results from ALU 306 are stored in an allocation results table 308. Table 308 feeds outputs to allocation bus 132. The key element in unit 104 is execution manager 302, which, with its extensive flexibility, enables various allocation schemes.

Commanding End-Stations Unit 106

Figure 4:
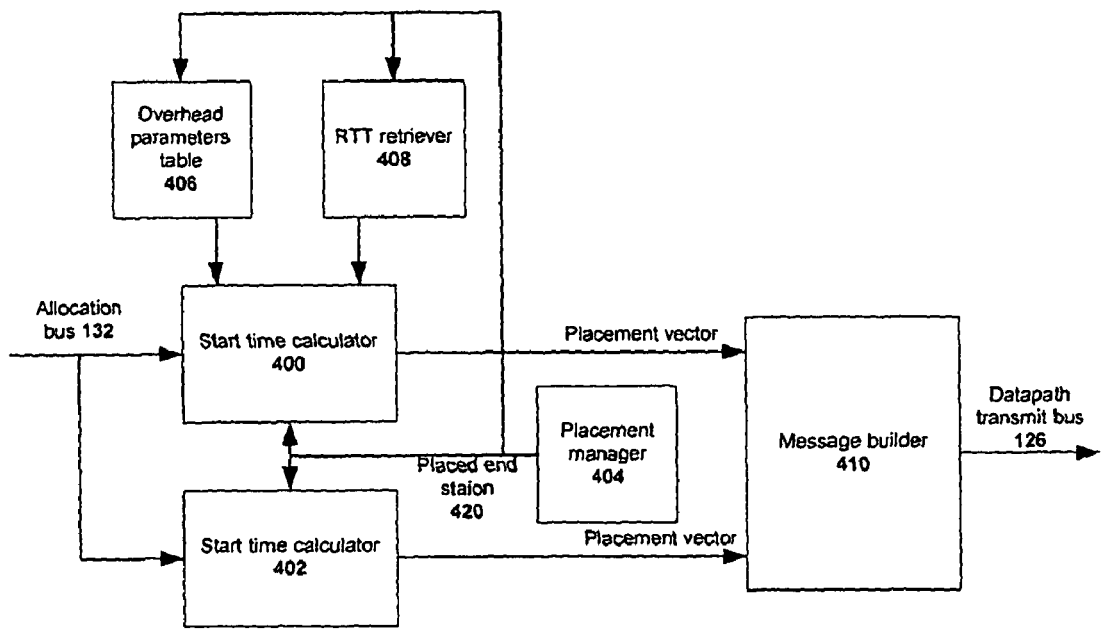
FIG. 4 shows schematically a block diagram a commanding end-stations unit.

FIG. 4 shows schematically a block diagram of unit 106, which converts the allocation values into placements on the timeline. The allocation values are taken from allocation bus 132. Unit 106 preferably comprises two engines for placement, a first start time calculator 400 and a second start time calculator 402. The two engines are used for is enabling grant cycles with 2 zones, for example, a zone for data and a zone for control. Alternatively, the two engines may also be used to zone for one kind of service (guaranteed bandwidth type), and for another zone for another kind of services (best effort type). Each time calculator is operative to compensate for the overhead specific for each end station. The overhead is stored in an overhead parameters table 406. The RTT of each end station, is considered and retrieved using a RTT retriever subunit 408. A placement manager 404 manages the engine operations. It determines the placed end station identity, as conveyed in a message. 420. A message builder 410 receives the placement results from calculators 400-402 and converts them into messages toward the end stations. In a PON, the format of each message can be set as compliant to either IEEE802.3ah EPON or to ITU-T G.984 GPON. Data-path transmit bus 126, which can be any bus best suited for either EPON or GPON, is used to carry the messages toward the data-path The key components in unit 106 are engines 400 and 402, capable of off-loading the CPU.

In some embodiments of the system, start time calculator 402 may be optional, enabling operation of 2-lines grant. A single line grant can work in most of the DBA algorithm, but some high-end algorithms require 2-lines grant.

Monitoring Unit 108

Figure 1B:
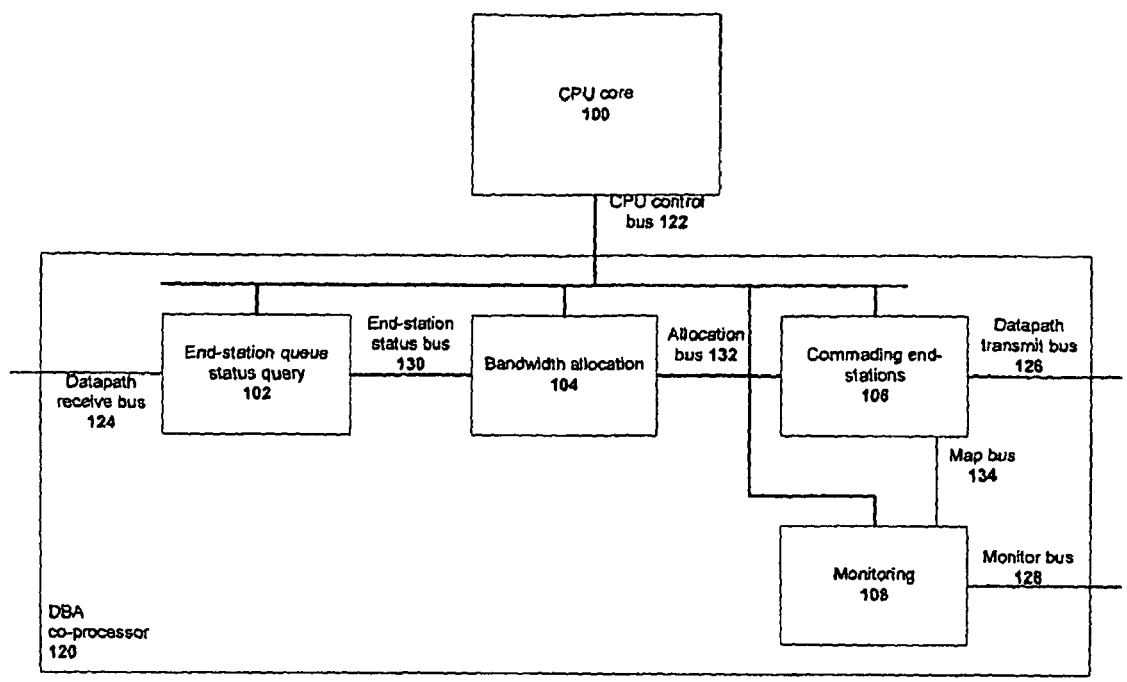

As mentioned with reference to FIG. 1*b*, unit 108 remembers the placement and follows the timeline to assist internal and external circuitries to follow the end stations transmission. Unit 108 comprises tables (not shown), which are being filled with every transmission command message and being emptied after the expected time of the grant has arrived, and after the grant was notified to the system components. That is, an entry is written to the table in any event of a message sent toward an end station. The entry is removed from the table after the end station had transmitted the grant commanded by the message. Monitor bus 128 is used to carry this information. The bus carries information to the expected transmitting end station, and the timing signal relevant for this transmission.

Example

The following example describes the implementation of the present invention in a network with four ONUs 1-4. Report reception is performed in a first phase. Each ONU transmits a report message. The report message is embedded in the uplink data-path and transmitted through bus 124, reaching end-station query unit 102, where it is identified in datapath parsing block 200. Assume exemplarily that reports from ONUs 1, 2 and 4 have arrived. Also assume that the original queue report value of ONU 1 was {100, 0, 0, 200, 500, 400, 100, 2000}, of ONU 2 was {0, 0, 0, 0, 0, 0, 0, 0} and of ONU 4 was {0, 0, 500, 500, 2000, 5000, 3000, 5000}. The values of the queue reports are processed and summed. The sum is taking the first 4 values as a first result and the remaining 4 values as a second result, yielding {300, 3000} for ONU 1 and {1000, 15000} for ONU 4. Report adjusting block 202 sets the maximal and minimal values per unit. For example, the ONU 1 minimal values are {500, 500} and the maximal values are {5000, 5000}, yielding {500, 3000} after processing. The ONU 4 minimal values are (0, 0) and the maximal values are {500, 10000}, yielding {500, 10000} after completion. These values are stored in table storage 204. Report accumulation unit 206 sums both results, resulting in a total of {1000, 13000}. Fresh report marking block 208 marks ONUs 1, 2, 4 as fresh. The timer of these three ONUs is reset in report timeout block 212. Reports from ONUs 1 and 4 are marked as non-empty in non-zero report marking block 210. At this stage, the CPU may receive an interrupt. All the CPU has to do is to read the two values of ONUs 1 and 4, as opposed to the significant processing which should have be performed otherwise, as commonly done in prior art. The saving is increasing linearly with the number of ONUs. The more ONUs exist in the network, the higher the savings.

In summary, the present invention discloses a DBA processor (and processing system when integrated on a chip) that provides both the flexibility of a CPU and the strength of dedicated hardware acceleration in dynamic allocation of bandwidth.

All publications mentioned in this specification are herein incorporated in their entirety by reference into the specification, to the same extent as if each individual publication was specifically and individually indicated to be incorporated herein by reference While the invention has been described with respect to a limited number of embodiments, it will be appreciated that many variations, modifications and other applications of the invention may be made.

What is claimed is:

1. In a passive optical network (PON) implementing shared access between at least one central unit and a plurality of end-stations, a dynamic bandwidth allocation (DBA) processor comprising:
   a. a DBA co-processor, for performing and accelerating DBA functions, that includes:
      i. an end-station queue status query unit, coupled to end-stations through a PON data-path receive bus and operative to identify bandwidth report messages of a PON protocol, from end stations, in a data stream received from the PON data-path receive bus and to process the bandwidth report messages;
      ii. a bandwidth allocation unit operative to decide the amount of allocated bandwidth to each end station, based on the bandwidth report messages; and
      iii. a commanding end-stations unit, coupled to the end-stations through a PON data-path transmit bus and operative to pass to the end-stations, PON messages that include placements on a timeline, based on the information on the allocated bandwidth; and
   b. a central processing unit (CPU) core is logically coupled to the DBA co-processor through a CPU bus and operative to configure and dynamically control all DBA co-processor units and to run sections of algorithms that cannot be accelerated on the DBA co-processor;
   wherein the PON data-path receive bus and the PON data-path transmit bus bypass the CPU core; and
   whereby the DBA processor provides both the flexibility of a CPU and the strength of dedicated hardware acceleration in dynamic allocation of bandwidth in the communications network.

2. The DBA processor of claim 1, wherein the DBA co-processor further includes:
   iv. a monitoring unit operative to remember the allocation and to follow said timeline to assist internal and external circuitries in the system to follow end station transmissions.

3. The DBA processor of claim 2, wherein the DBA co-processor further includes a plurality of buses for connecting the DBA processor to a datapath and for interconnecting the end-station queue status query unit, the bandwidth allocation unit, the commanding end-stations unit and the monitoring unit.

4. The DBA processor of claim 3, wherein the plurality of buses includes:
   i. the data-path receive bus used for transferring a stream of data and control packets from a data-path toward the DBA processor;
   ii. the data-path transmit bus used for transmitting messages from the DBA processor toward the data-path;
   iii. an end station status bus used for transferring processed end-station status from the end-station queue status query unit to the bandwidth allocation unit;
   iv. an allocation bus used for transferring allocation results from the bandwidth allocation unit to the commanding end-stations unit;
   v. a map bus used for transferring the location of end-station transmissions to the monitoring unit; and
   vi. a monitor bus used for transmitting the identity of an end-station about to transmit to all units of the system that require this information.

5. The DBA processor of claim 1, wherein the CPU bus is an open code protocol (OCP) bus.

6. The DBA processor of claim 1, wherein the communications network includes a fast wireless network.

7. The DBA processor of claim 1, implemented as a system-on-chip.

8. In a passive optical network (PON) implementing shared access between at least one central unit and a plurality of end-stations, a dynamic bandwidth allocation (DBA) processor comprising:
   a. a central processing unit (CPU) core;
   b. a CPU bus coupled to the CPU core; and
   c. a dedicated hardware DBA processing module coupled to the CPU core through the CPU bus and operative to perform and accelerate DBA functions, the module including i. a bandwidth allocation unit operative to decide the amount of allocated bandwidth to each end station, based on bandwidth report messages from the plurality of end-stations;

ii. an end-station queue status query unit, coupled to the bandwidth allocation unit and to the plurality of end-stations through a PON data-path receive bus and operative to identify the bandwidth report messages of a PON protocol, from end stations, in a data stream received from the PON data-path receive bus and to process the bandwidth report messages;

iii. a commanding end-stations unit, coupled to the bandwidth allocation unit and to the plurality of end-stations through a PON data-path transmit and operative to pass to the end-stations, PON messages that include placements on a timeline, based on the information on the allocated bandwidth;

wherein the PON data-path receive bus and the PON data-path transmit bus bypass the CPU core; and whereby the CPU core configures and dynamically controls the DBA hardware processing module operation and functions, and whereby the DBA hardware processing module significantly accelerates the bandwidth allocation in the communications system.

9. The DBA processor of claim 8, wherein the dedicated hardware DBA processing module further includes:

vi. a monitoring unit operative to remember the bandwidth allocation and to follow said timeline to assist internal and external circuitries in the network to follow end station transmissions.

10. The DBA processor of claim 9, wherein the DBA processing module further includes a plurality of buses for connecting the DBA processor to a datapath and for interconnecting the end-station queue status query unit, the bandwidth allocation unit, the commanding end-stations unit and the monitoring unit.

11. The DBA processor of claim 8, wherein the CPU bus is selected from the group of an industry bus and an extension of CPU op-codes.

12. The DBA processor of claim 8, wherein the communications network includes a fast wireless network.

13. The DBA processor of claim 8, implemented as a system-on-chip.

14. A method for accelerating dynamic bandwidth allocation (DBA) functions in a passive optical network (PON) implementing shared access between at least one central unit and a plurality of end-stations, the method comprising the steps of:

a. providing a DBA co-processor operative to perform and accelerate DBA functions, wherein the DBA co-processor includes:
  i. an end-station queue status query unit, coupled to end-stations through a PON data-path receive bus and operative to identify bandwidth report messages of a PON protocol, from end stations, in a data stream received from the PON data-path receive bus and to process the bandwidth report messages;
  ii. a bandwidth allocation unit operative to decide the amount of allocated bandwidth to each end station, based on the bandwidth report messages; and
  iii. a commanding end-stations unit, coupled to end-stations through a PON data-path transmit bus and operative to pass to the end-stations, PON messages that include placements on a timeline, based on the information on the allocated bandwidth to the end-stations; and b. providing a central processing unit (CPU) core logically coupled to the DBA co-processor through a CPU bus and operative to configure and dynamically control all DBA co-processor units and to run sections of algorithms that cannot be accelerated on the DBA co-processor;

wherein the PON data-path receive bus and the PON data-path transmit bus bypass the CPU core.

15. The method of claim 14, wherein the step of providing a DBA co-processor further includes providing a monitoring unit operative to remember the allocation and to follow said timeline to assist internal and external circuitries to follow end station transmissions.

16. The method of claim 14, wherein the step of providing a DBA co-processor further includes providing a plurality of buses for connecting the DBA processor to a datapath and for interconnecting the end-station queue status query unit, the bandwidth allocation unit, the commanding end-stations unit and the monitoring unit.

* * * * *